(12) United States Patent
Schwarz et al.

(10) Patent No.: US 9,340,192 B2
(45) Date of Patent: May 17, 2016

(54) VEHICLE BRAKE SYSTEM FOR A MOTOR VEHICLE AND METHOD FOR ACTUATING THE VEHICLE BRAKE SYSTEM DURING RELEASE OF THE PARKING BRAKE FUNCTION

(75) Inventors: Michael Schwarz, Koblenz (DE); Holger Schmidt, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 262 days.

(21) Appl. No.: 13/813,304

(22) PCT Filed: Jul. 7, 2011

(86) PCT No.: PCT/EP2011/003389
§ 371 (c)(1),
(2), (4) Date: Apr. 9, 2013

(87) PCT Pub. No.: WO2012/016621
PCT Pub. Date: Feb. 9, 2012

(65) Prior Publication Data
US 2014/0144730 A1   May 29, 2014

(30) Foreign Application Priority Data
Aug. 3, 2010   (DE) .......................... 10 2010 033 273

(51) Int. Cl.
| | |
|---|---|
| *B60T 13/70* | (2006.01) |
| *B60T 13/58* | (2006.01) |
| *B60T 7/04* | (2006.01) |
| *B60T 13/66* | (2006.01) |
| *B60T 13/74* | (2006.01) |
| *F16D 55/226* | (2006.01) |

(Continued)

(52) U.S. Cl.
CPC ............... *B60T 13/588* (2013.01); *B60T 7/042* (2013.01); *B60T 8/32* (2013.01); *B60T 13/662* (2013.01);

(Continued)

(58) Field of Classification Search
CPC ..... B60T 7/042; B60T 13/588; B60T 13/662; B60T 13/741; B60T 13/746; B60T 8/32; F16D 65/18; F16D 55/226; F16D 2121/02; F16D 2121/24; F16D 2123/00
USPC ........... 188/72.3, 156, 162, 72.1, 71.9; 303/3, 303/15, 191, 192
See application file for complete search history.

(56) References Cited

U.S. PATENT DOCUMENTS

| | | | |
|---|---|---|---|
| 6,311,808 B1 * | 11/2001 | Halasy-Wimmer et al. . | 188/72.6 |
| 7,134,533 B2 * | 11/2006 | Hashida ....................... | 188/72.8 |

(Continued)

FOREIGN PATENT DOCUMENTS

| | | | |
|---|---|---|---|
| DE | 10150803 A1 | 5/2003 | |
| DE | 102005042282 A1 * | 3/2007 | |

(Continued)

*Primary Examiner* — Thomas J Williams
*Assistant Examiner* — Mariano Sy
(74) *Attorney, Agent, or Firm* — MacMillan, Sobanski & Todd, LLC

(57) ABSTRACT

A vehicle brake system having a hydraulically actuable disc brake device which has an electromechanical actuating device for activating a parking brake function, wherein the vehicle brake system has a hydraulic circuit with a hydraulic pressure source and actuable hydraulic functional elements, in order to hydraulically actuate the disc brake device in accordance with a service brake action of a driver or an automatic activation of a driving assistance system, wherein, furthermore, the vehicle brake system has a control device, in order to actuate the electromechanical actuating device in accordance with a parking brake action of the driver or an automatic activation of the parking brake function. In order to avoid abrupt release of the parking brake function, it is provided here that the control device is configured for actuating at least one of the hydraulic functional elements in such a way that, in order to release the parking brake function, a hydraulic fluid volume is isolated in the disc brake device by actuation of the electromechanical actuating device and the hydraulic fluid volume can be used to generate a predefined hydraulic pressure hydraulically during the release of the parking brake function by the electromechanical actuating device.

9 Claims, 4 Drawing Sheets

(51) Int. Cl.
    *F16D 65/18*     (2006.01)
    *B60T 8/32*     (2006.01)
    *F16D 121/02*     (2012.01)
    *F16D 121/24*     (2012.01)
    *F16D 123/00*     (2012.01)

(52) U.S. Cl.
    CPC ............ *B60T 13/741* (2013.01); *B60T 13/746* (2013.01); *F16D 55/226* (2013.01); *F16D 65/18* (2013.01); *F16D 2121/02* (2013.01); *F16D 2121/24* (2013.01); *F16D 2123/00* (2013.01)

(56) References Cited

U.S. PATENT DOCUMENTS

| | | | |
|---|---|---|---|
| 7,744,166 B2 * | 6/2010 | Leiter et al. .................... 303/20 |
| 7,753,178 B2 * | 7/2010 | Ohtani et al. ................. 188/72.7 |
| 8,322,495 B2 | 12/2012 | Leiter et al. |
| 2004/0043868 A1 * | 3/2004 | Ewinger et al. ............... 477/189 |
| 2008/0029319 A1 * | 2/2008 | Fleckner et al. ............. 180/65.2 |
| 2008/0053760 A1 * | 3/2008 | Oikawa et al. ............... 188/72.4 |
| 2008/0173518 A1 * | 7/2008 | Klusemann ................. 192/219.4 |
| 2009/0133975 A1 | 5/2009 | Gilles |
| 2011/0042171 A1 | 2/2011 | Knechtges |
| 2013/0213746 A1 * | 8/2013 | Poertzgen et al. ............ 188/72.6 |

FOREIGN PATENT DOCUMENTS

| | | |
|---|---|---|
| DE | 102005051082 A1 | 5/2007 |
| DE | 102008012338 A1 | 9/2009 |
| EP | 1777133 A1 | 4/2007 |
| WO | 2005059395 A1 | 6/2005 |
| WO | 2007036357 A1 | 4/2007 |

\* cited by examiner

VEHICLE BRAKE SYSTEM FOR A MOTOR VEHICLE AND METHOD FOR ACTUATING THE VEHICLE BRAKE SYSTEM DURING RELEASE OF THE PARKING BRAKE FUNCTION

CROSS-REFERENCE TO RELATED APPLICATIONS

This application is a national stage of International Application No. PCT/EP2011/003389 filed Jul. 7, 2011, the disclosures of which are incorporated herein by reference in entirety, and which claimed priority to German Patent Application No. DE 10 2010 033 273.9 filed Aug. 3, 2010, the disclosures of which are incorporated herein by reference in entirety.

BACKGROUND OF THE INVENTION

The present invention relates to a vehicle brake system with a hydraulically controllable disc brake device, which has an electromechanical actuating device for activating a parking brake function, the vehicle brake system having a hydraulic circuit with a hydraulic pressure source, as well as controllable hydraulic function elements, in order to hydraulically control the disc brake device in accordance with a service brake action of a driver or an automatic activation, the vehicle brake system further having a control device, in order to control the electromechanical actuating device in accordance with a parking brake action of the driver or an automatic activation of the parking brake function. The invention furthermore relates to a method for controlling a parking brake system of the kind described above.

Vehicle brake systems are known in diverse forms from the prior art. Specifically, the document DE 10 2005 051 082A1, and corresponding U.S. Pat. No. 8,322,495B2, both of which are incorporated by reference herein in entirety, describes a vehicle brake system with a disc brake designed as a floating-caliper disc brake. In this system, a friction pad arrangement with two opposite friction pads on either side of a brake disc is provided. One friction pad lies against a floating caliper, whereas the other friction pad can be hydraulically displaced relative to the floating caliper via an actuating piston. As a result of a hydraulic charging of an actuating piston, the movable brake pad is displaced onto the brake disc. The brake pad fixed to the floating caliper is drawn in a manner known per se, via the floating-caliper function, from the other side against the brake disk, so that a braking force acts on the brake disc on both sides.

In addition to this floating-caliper function which has been known for a long time, however, this prior art moreover also provides an electromechanical actuating device. This device is used to perform a parking brake function. With corresponding control, besides the hydraulic displacement, the disc brake can also be electromechanically actuated as well. The electromechanical actuating device is usually provided with self-locking, so that when the parking brake function has been activated and the brake tensioned, the system remains in the parking brake state and is not independently released therefrom. This ensures that this state is maintained after parking the vehicle and when the parking brake is activated. To release the parking brake function, the self-locking must then be overcome.

However, it has been found that on releasing the parking brake function, problems may arise if the self-locking is to be overcome by means of the electromechanical actuating device. This is due to the fact that the parking brake function is released jerkily or suddenly when the required actuating force for overcoming the self-locking is reached or exceeded. This is felt by the driver as abrupt releasing of the parking brake, which may be felt as a loss of comfort during starting processes, in particular when the starting process takes place downhill. In the event of an abrupt release of the parking brake, there results a correspondingly high acceleration, which is intensified by the downhill force. In order to avoid this, the driver would have to intervene with an active braking process.

BRIEF SUMMARY OF THE INVENTION

It is a feature of the present invention to provide a disc brake device of the kind described at the outset, in which an abrupt release of the parking brake function can be effectively prevented.

This feature is achieved by a disc brake of the kind described at the outset, in which it is provided that the control device is adapted to control at least one of the hydraulic function elements in such a way that, in order to release the parking brake function by controlling the electromechanical actuating device, a hydraulic fluid volume present in the disc brake devices can be hydraulically isolated or locked in to generate a predetermined hydraulic pressure during the release of the parking brake function by means of the electromechanical actuating device.

According to the invention, it is thus provided that the hydraulic fluid volume present in the hydraulic circuit or in the disc brake devices is isolated before the release of the parking brake function. On the release of the parking brake function by activating the electromechanical actuating device, the volume in the disc brake device is reduced, with the result that a certain hydraulic pressure is built up. Thus, if on the release of the parking brake function, a sufficiently large actuating force is produced so that the self-locking is overcome, the parking brake is initially released until the actuating piston of the disc brake device is so to speak cushioned by the prevailing hydraulic pressure in the disc brake device. This means that the disc brake device cannot be abruptly fully released when the self-locking is overcome, but rather is still maintained in a hydraulically tensioned state owing to the prevailing hydraulic pressure which is determined by the isolated or locked-in hydraulic fluid volume. If the isolated (locked-in) hydraulic fluid volume is then freed stepwise, continuously or in a regulated manner with the aid of a specific characteristic curve, the parking brake function can be gently released, which ultimately avoids abrupt processes. If the driver, for example, starts downhill, this gentle release of the parking brake function can prevent the vehicle from accelerating abruptly.

According to the invention, it may be provided that the hydraulic circuit has a plurality of controllable valves, in order to selectively build up hydraulic pressure in individual disc brake devices of the vehicle brake system according to the above description, on the release of the parking brake function, by isolating the hydraulic fluid volume. Customarily, the valves are controlled in the context of service braking in accordance with the set values of a slip control system. In this connection, according to the invention it may be provided that the valves are controllable via the control device in such a way that only those disc brake devices of the vehicle brake system which are designed with a mechanical actuating device can be hydraulically isolated. These are generally the disc brake devices at the rear wheels.

As already indicated above, it is possible according to the invention for the control device to be formed with a slip control function. In this case, it may be provided that the hydraulic volume can be isolated by means of at least one valve assigned to the slip control function. The valve may, for example, be a brake circuit shut-off valve or an ABS inlet valve of a slip control system.

The invention furthermore relates to a method for controlling a vehicle brake system to release a parking brake function of the kind described above, comprising the following steps:

detecting a command to release an activated parking brake function, isolating a hydraulic fluid volume present in the disc brake devices by controlling the hydraulic circuit in order to exert a hydraulic pressure in the disc brake devices on the release of the parking brake function, activating the electromagnetic actuating device to release the parking brake function and freeing the hydraulic fluid volume.

In this method according to the invention, it may be provided that the freeing of the hydraulic fluid volume is carried out in accordance with a preset or variable gradient. The gradient may, for example, be stored in the electronic control device of the vehicle or of the vehicle brake system. However, it may also be a variable gradient or a family of characteristics which determines the profile of the freeing of the hydraulic fluid volume depending on the current operating situation. Specifically, the freeing of the hydraulic fluid volume may take place over a longer or shorter period of time and with a linear, progressive or degressive profile.

In this connection, it may be provided in the method according to the invention that the gradient is adjustable in accordance with certain parameters, in particular based on parameters representing the starting process. Specifically, it may be provided that the parameters comprise current values or/and the time profile of the actuation of the accelerator pedal or/and of the actuation of the clutch or/and of the rotational speed of the drive motor or/and of the torque of the drive motor or/and of the inclination of the road.

Other advantages of this invention will become apparent to those skilled in the art from the following detailed description of the preferred embodiments, when read in light of the accompanying drawings.

DETAILED DESCRIPTION OF THE INVENTION

Figure 1:
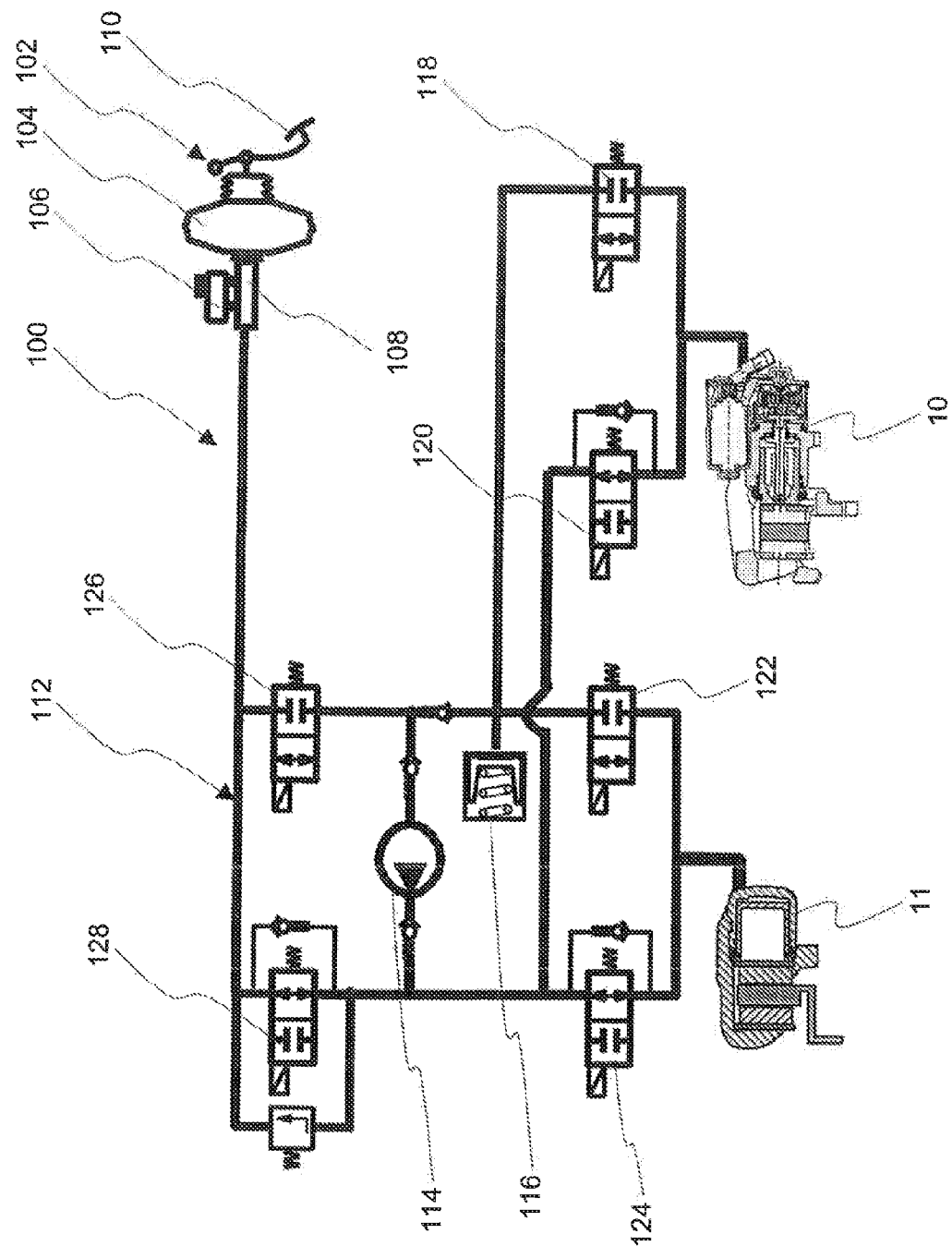
FIG. 1 illustrates a circuit diagram of a vehicle brake system according to the invention, showing schematically a disc brake device for a front wheel and a disc brake device for a rear wheel.

FIG. 1 shows schematically a circuit diagram for a vehicle brake system 100 according to the invention. This system comprises a pressure source 102 which is formed with a brake booster 104, a reservoir 106, a brake master cylinder 108 and a brake pedal 110 actuable by the driver. The pressure source 102 is hydraulically coupled to a hydraulic brake circuit 112. This circuit has a motor-controllable pump 114, as well as a pressure accumulator 116. Furthermore, two disc brake devices, namely a disc brake device 10 for a rear wheel and a disc brake device 11 for a front wheel, can be seen.

Valves 118, 120, 122, 124, controllable via a control device (not shown), are assigned to each of the disc brake devices 10, 11. Furthermore, inlet valves 126 and 128, which enable the hydraulic brake circuit 112 to be hydraulically decoupled from the pressure source 102 actuable by the driver, can also be seen.

With regard to the service brake function, the schematically shown vehicle brake system 100 operates in a manner known per se. The control device (not shown) furthermore provides a slip control function, in order to be able to carry out antilock control (ABS), traction control (TCS), driving dynamics control (ESP) and automatic braking, e.g. for adaptive speed control (ACC).

In the following, for a better understanding, the structure of the disc brake device 10 at the rear wheel is discussed in detail.

Figure 2:
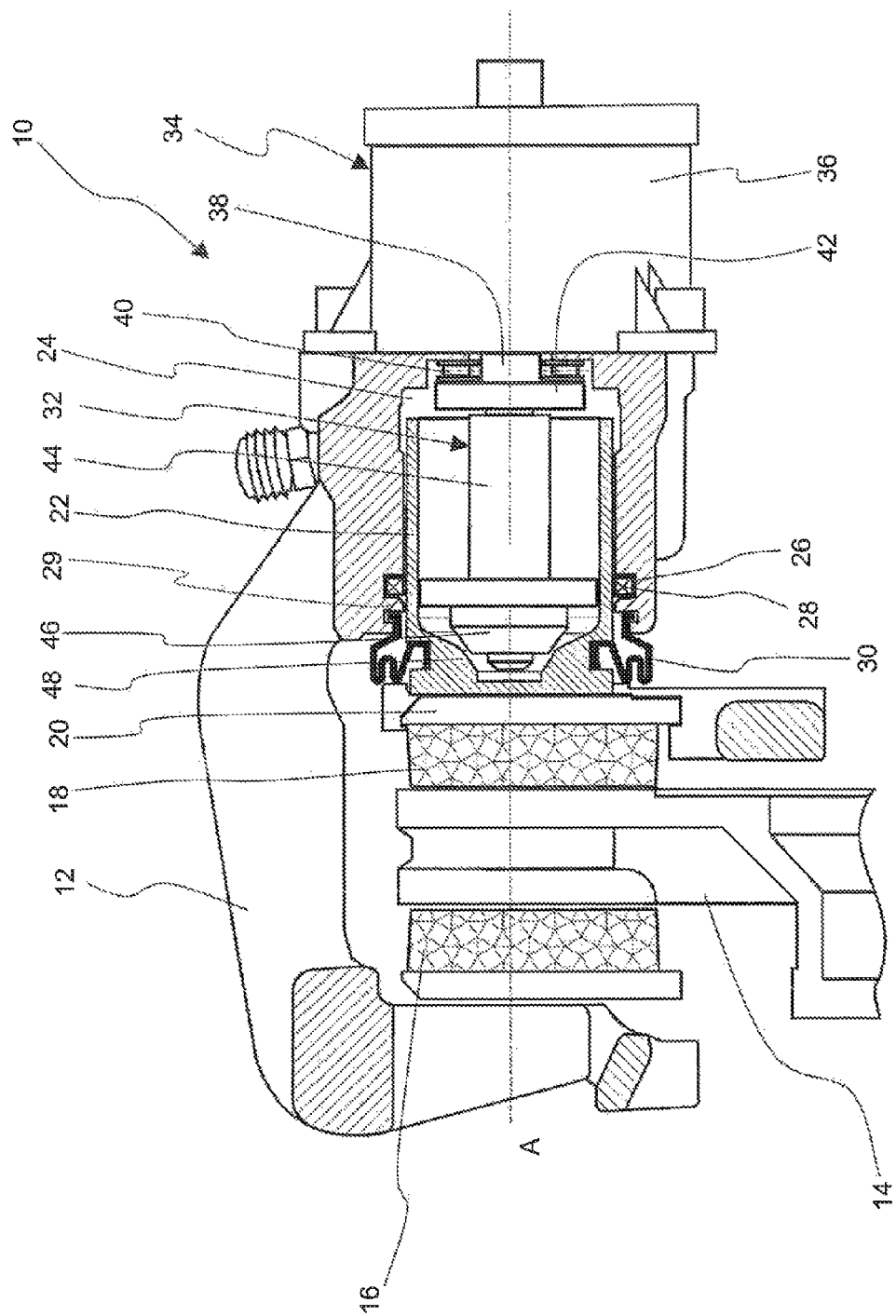
FIG. 2 illustrates a partially sectioned detail view of the disc brake device for the rear wheel according to FIG. 1 with corresponding parking brake device.

FIG. 2 illustrates the disc brake device 10 according to the invention in a partial sectional view. This device comprises a brake caliper 12 which is supported in a floating manner in customary fashion via a brake carrier (not shown) and straddles a brake disc 14 coupled in a rotationally fixed manner to a vehicle wheel. In the brake caliper 12 there is provided a brake pad arrangement having a brake pad 16 lying against the brake caliper 12 and a brake pad 18 lying against an actuating piston 22. The two brake pads 16 and 18 face one another and, in the release position shown in FIG. 2, are arranged with a small clearance on both sides of the brake disc 14, so that no appreciable residual friction torques occur. The movable brake pad 18 is arranged, via a brake pad carrier 20, on an actuating piston 22 for joint movement. The actuating piston 22 is displaceably mounted in a cylindrical hollow space 24 in the brake caliper 12. In the region of this hollow space 24 near the brake disc, there is provided an encircling receiving groove 26, in which an annular sealing element 28 is received.

It can furthermore be seen that the actuating piston 22 is provided, at its end on the left in FIG. 2 and facing the brake disc 14, with an encircling bellows 30 which prevents dirt from penetrating into the region between the actuating piston 22 and the encircling wall defining the receiving hollow space 24 of the brake caliper 12.

In FIG. 2 it can furthermore be seen that the actuating piston 22 is of hollow form. A thrust piece 32 of an electromechanical actuating arrangement 34 is received in this piston. The electromechanical actuating arrangement 34 comprises a drive assembly 36 with an electric motor and a gear arrangement. An output shaft 38 of this drive assembly 36 drives a drive spindle 42 which is supported via an axial bearing 40 and is threadingly received in a threaded receptacle 44 of the thrust piece 32.

The thrust piece 32 has, in its region on the left in FIG. 2 and facing the brake disc 14, a conical section 46 which can be brought into abutment with a complementarily conical inner surface 48 of the actuating piston 22. In the release position shown in FIG. 2, there is a clearance between the two conical surfaces 46 and 48.

If the brake is now hydraulically actuated by the driver via the brake pedal or automatically via a driving assistance system (e.g. ACC or hill-hold with hill-start or hill-descent aid) or a safety system (e.g. ESP), a hydraulic pressure is built up in the hollow space 24 in a manner known per se, so that the actuating piston 22 is displaced along the longitudinal axis A towards the left in FIG. 1. Subsequently, the brake pad 18 is pressed onto the brake disc 14 by the floating-caliper arrangement in a manner known per se and at the same time the brake pad 16, by corresponding displacement of the brake caliper 12 on the other side of the brake disc 14, is drawn against the latter.

By charging the interior space 24 with hydraulic fluid under pressure, the actuating piston 22 is displaced along the longitudinal axis A towards the left in FIG. 2, so that a braking action results. Under the pressure present and through the movement of the actuating piston 22, the radially outer sealing element 28 is deformed elastically into the region of a bevel-shaped recess 29.

If, for example by releasing the brake pedal or deactivation of the driving assistance or safety system, the hydraulic pressure in the interior space 24 of the brake caliper 12 is now reduced, the sealing element 28 is able to elastically relax again and assume its initial shape corresponding to FIG. 1. This means that, in the course of its elastic relaxation, it withdraws the actuating piston 22 again from the actuating position owing to the mutual frictional contact and thus sets the disc brake device into its initial state. This corresponds to the roll-back function known per se, which is obtained in conventional brakes via the outer seal 28 at the outer circumference of the actuating piston 22.

With regard to an activation of the parking brake function, two cases are to be distinguished: If there is no hydraulic pressure present in the interior 24 of the disc brake device 10 and biasing the actuating piston 22, according to the invention only the electromechanical actuating device 34 is controlled to activate the parking brake function. If, however, a hydraulic pressure is applied to the disc brake device 10 and biases the actuating piston 22, for example because a driver has depressed the brake pedal before activation of the parking brake function or automatic braking has been performed, then the pressure state prevailing in the interior space 24 due to service braking is utilised to activate the parking brake function.

In this regard, the electromechanical actuating device 24 is controlled. Under the effect of the electromechanical actuating device 24, the thrust piece 32 is displaced forwards until the clearance is used up and the conical surface 46 abuts against the corresponding conical surface 48 in the interior of the actuating piston 22. The result of this that the actuating piston 22 is axially supported on the housing of the brake caliper 12 via the thrust piece 32 and the axial bearing 40. The thrust piece 32 then moves the actuating piston 22 further forwards, in order to achieve the desired parking brake action.

The parking brake state is maintained owing to the position of the thrust piece 44 and the self-locking (for example by a self-locking gear between spindle 42 and receptacle 44). The brake pads 16, 18 pressing against the brake disc 14 are supported via the thrust piece 32.

If the parking brake state is now to be released again, the electromechanical actuating device 34 which is in the self-locking state is controlled. The processes for releasing the parking brake state are shown in detail in FIG. 4 with the aid of curves, the curve $K_1$ (dotted line) representing the tension force generated by the electromechanical actuating device, the curve $K_2$ (dot-dash line) representing the tension force generated by isolating hydraulic fluid and the curve $K_3$ (dashed line) representing the total tension force currently present.

Figure 3:
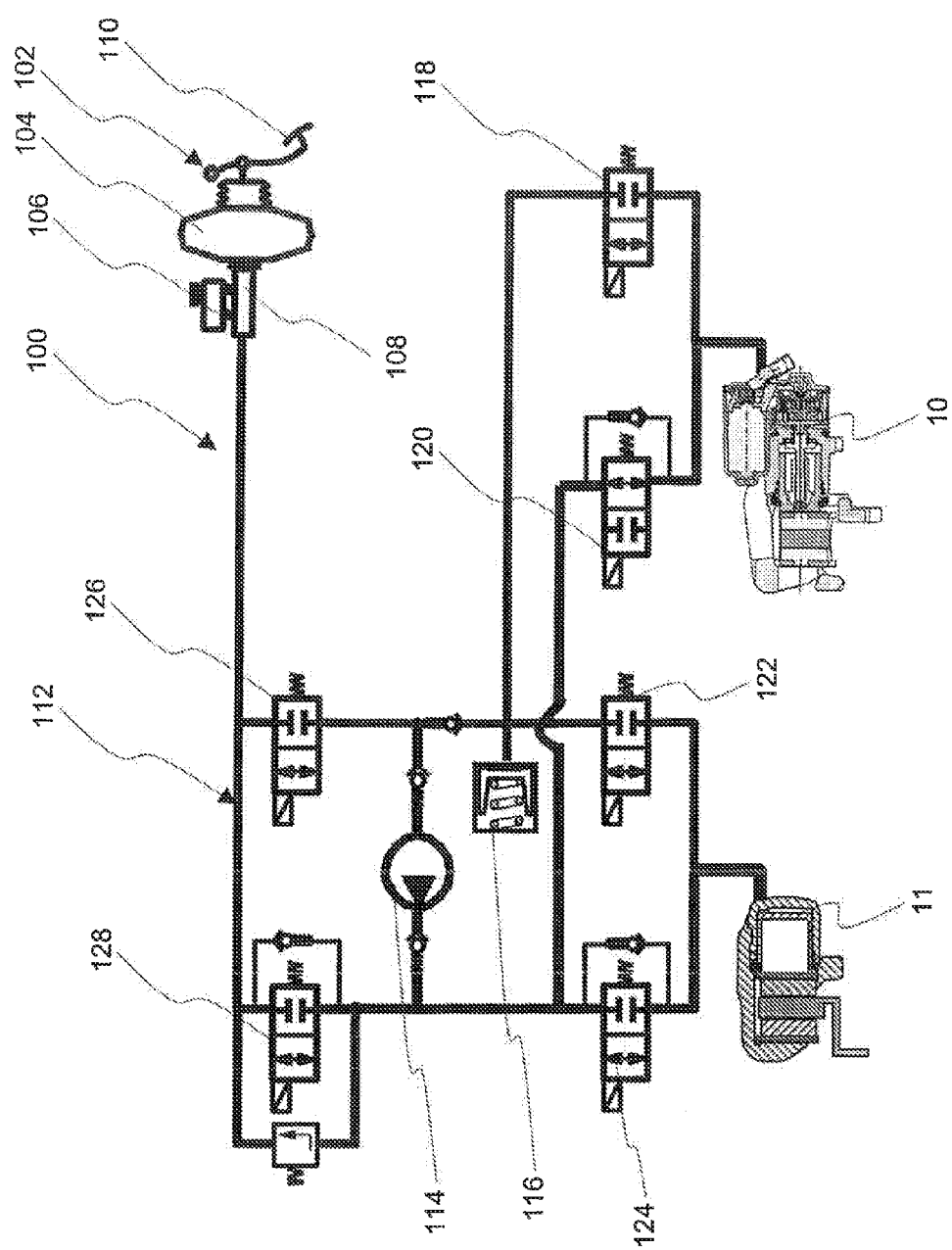
FIG. 3 illustrates the circuit diagram according to FIG. 1 in the case of a control for releasing the parking bake function after feeding in hydraulic fluid.
Figure 4:
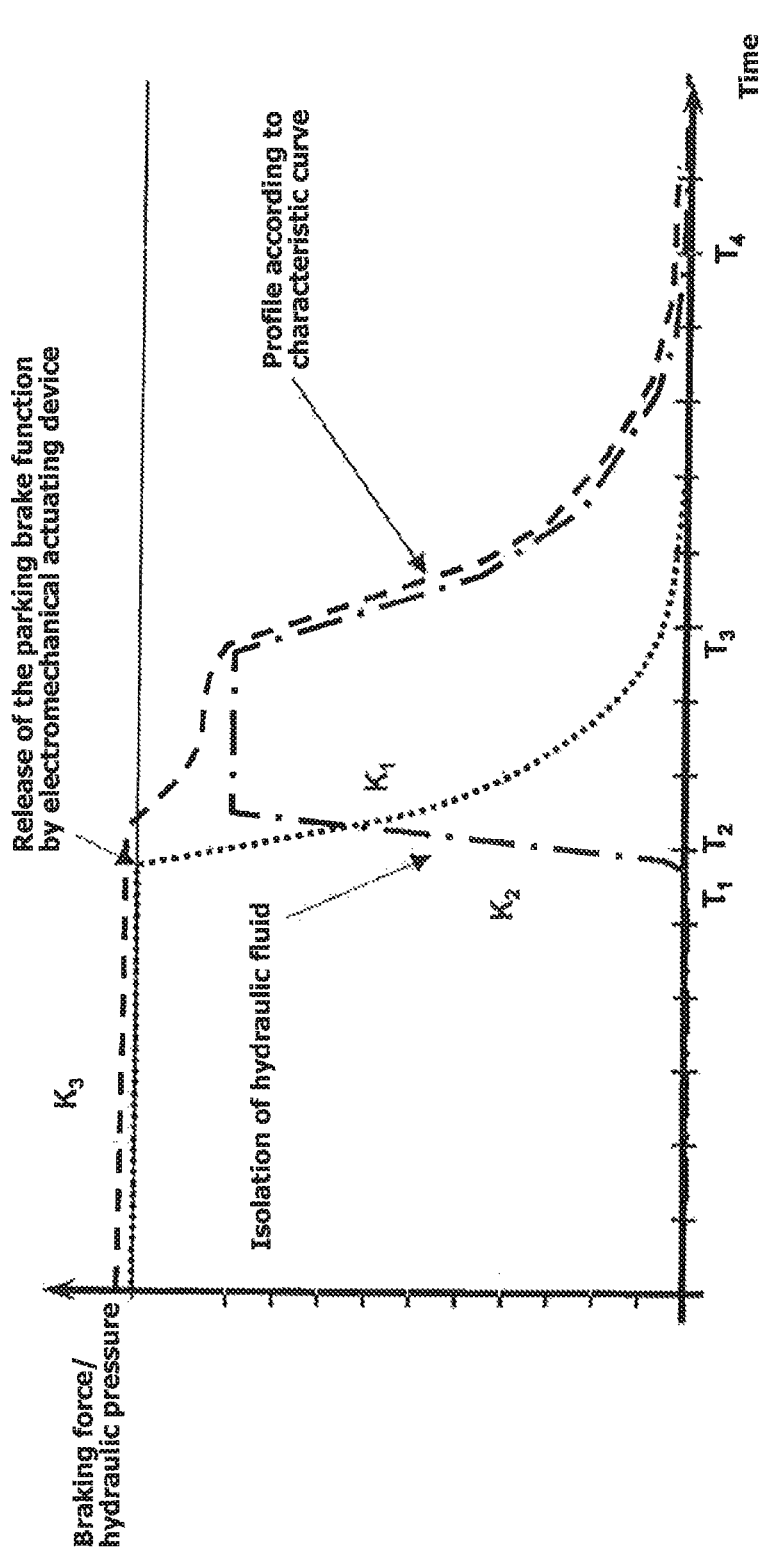
FIG. 4 illustrates a graph for explaining the functioning of the invention.

As shown in FIG. 4, at the instant $T_1$, by activation of the electromechanical actuating device 34 to release the parking brake function according to curve $K_2$, a hydraulic fluid volume is isolated in the interior space 24, in which the brake circuit shut-off valve 128 is shut off, as illustrated in FIG. 3. As a result, the prevailing hydraulic pressure in the interior space 24 is initially maintained. If the electromechanical actuating device 34 is now further controlled, the latter reaches at the instant $T_2$ an actuating force which overcomes the aforementioned self-locking. Subsequently, the release of the parking brake function occurs.

As soon as the self-locking is overcome, the system tends to be released relatively quickly under the effect of the electromechanical actuating device 34. However, with the invention, no undesirably intense or abrupt release process occurs, because the actuating piston 22 is prevented from an abrupt return movement by the hydraulic pressure prevailing in the interior space 24. It is so to speak cushioned by the hydraulic fluid volume locked in the interior space 24 and the prevailing hydraulic pressure, as shown by the profile of the curve $K_3$. In other words, the hydraulic fluid can initially be locked in (isolated) by closing the brake circuit shut-off valve 128 (TC-Iso). Optionally, the inlet valve 124 (ABS-Iso) assigned to the disc brake device 11 can also be closed, as illustrated in FIG. 3. The parking brake action is therefore to a certain degree hydraulically maintained despite release of the self-locking. It is then possible, from the instant $T_3$, to reduce the hydraulically maintained parking brake function more or less quickly depending on the current operation situations. For this purpose, the brake circuit shut-off valve 128 (TC shut-off valve) can be controlled in accordance with a preset or variable characteristic curve and correspondingly opened. In accordance with the opening, the locked-in hydraulic fluid is freed and hence the prevailing hydraulic pressure reduced, until at the instant $T_4$ no more braking force is applied. The characteristic curve may be altered with the aid of certain current parameters, such as, for example, the current value or the profile of an actuation of the accelerator pedal or/and of the clutch or/and of the brake pedal. Further parameters may be: the current rotational speed or current torque of the drive motor or also the inclination of the road.

As a result, it is possible to adapt the release of the parking brake function to the current operating state. It is thus possible, for example in an uphill starting process, for the parking brake to be released substantially more quickly than in a downhill starting process. This characteristic can still be altered by the driving behaviour, for example depending on how strongly the driver depresses the accelerator pedal or how quickly he releases the clutch.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle brake system with a hydraulically controllable disc brake device, which has an electromechanical actuating device for activating a parking brake function, the vehicle brake system having a hydraulic circuit with a hydraulic pressure source, as well as controllable hydraulic function elements, in order to hydraulically control the disc brake device in accordance with a service brake action of a driver or an automatic activation, the vehicle brake system further having a control device, in order to control the electromechanical actuating device in accordance with a parking brake action of the driver or an automatic activation of the parking brake function, wherein the control device is adapted to control at least one of the hydraulic function elements in such a way that, in order to release the parking brake function by controlling the electromechanical actuating device, a hydraulic fluid volume present in the disc brake device can be hydraulically isolated to generate a predetermined hydraulic pressure during the release of the parking brake function by means of the electromechanical actuating device and wherein the freeing of the hydraulic fluid is carried out in accordance with a gradient, wherein the gradient is adjusted in accordance with certain parameters based on the parameters representing a starting process.

2. The vehicle brake system according to claim 1, wherein the hydraulic circuit has a plurality of controllable valves, in order to selectively charge individual disc brake devices of the vehicle brake system with hydraulic pressure or to hydraulically isolate the disc brake devices.

3. The vehicle brake system according to claim 2, wherein the valves are controllable via the control device in such a way that only those disc brake devices of the vehicle brake system which are designed with the electromechanical actuating device can be hydraulically isolated.

4. The vehicle brake system according to claim 2, wherein the hydraulic fluid volume can be isolated by means of at least one valve assigned to the slip control function.

5. The vehicle brake system according to claim 1, wherein the control device is formed with a slip control function.

6. The vehicle brake system according to claim 1, wherein the hydraulic circuit has a plurality of controllable valves, in order to selectively charge individual disc brake devices of the vehicle brake system with hydraulic pressure or hydraulically isolate the disc brake devices, and wherein the control device is formed with a slip control function.

7. A method for controlling a vehicle brake system with a hydraulically controllable disc brake device, which has an electromechanical actuating device for activating a parking brake function, the vehicle brake system having a hydraulic circuit with a hydraulic pressure source, as well as controllable hydraulic function elements, in order to hydraulically control the disc brake device in accordance with a service brake action of a driver or an automatic activation, the vehicle brake system further having a control device, in order to control the electromechanical actuating device in accordance with a parking brake action of the driver or an automatic activation of the parking brake function, wherein the control device is adapted to control at least one of the hydraulic function elements in such a way that, in order to release the parking brake function by controlling the electromechanical actuating device, a hydraulic fluid volume present in the disc brake device can be hydraulically isolated to generate a predetermined hydraulic pressure during the release of the parking brake function by means of the electromechanical actuating device to release a parking brake function comprising the following steps:

detecting a command to release an activated parking brake function, isolating a hydraulic fluid volume present in the disc brake device by controlling the hydraulic circuit in order to exert a hydraulic pressure in the disc brake device on the release of the parking brake function, activating the electromechanical actuating device to release the parking brake function, freeing the hydraulic fluid volume, wherein the freeing of the hydraulic fluid is carried out in accordance with a gradient, and adjusting the gradient in accordance with certain parameters based on the parameters representing a starting process.

8. The method according to claim 7, wherein the parameters comprise current values or a time profile of an actuation of an accelerator pedal or of an actuation of a clutch or of a rotational speed of a drive motor or of a torque of the drive motor or of an inclination of the road.

9. The method according to claim 7, wherein the parameters comprise current values and a time profile of an actuation of an accelerator pedal and of an actuation of a clutch and of a rotational speed of a drive motor and of a torque of the drive motor and of an inclination of the road.

* * * * *